April 4, 1933.
E. C. ROSENOW
FLOAT AND SAFETY VALVE
Re. 18,788
Original Filed April 21, 1928
Fig. 1
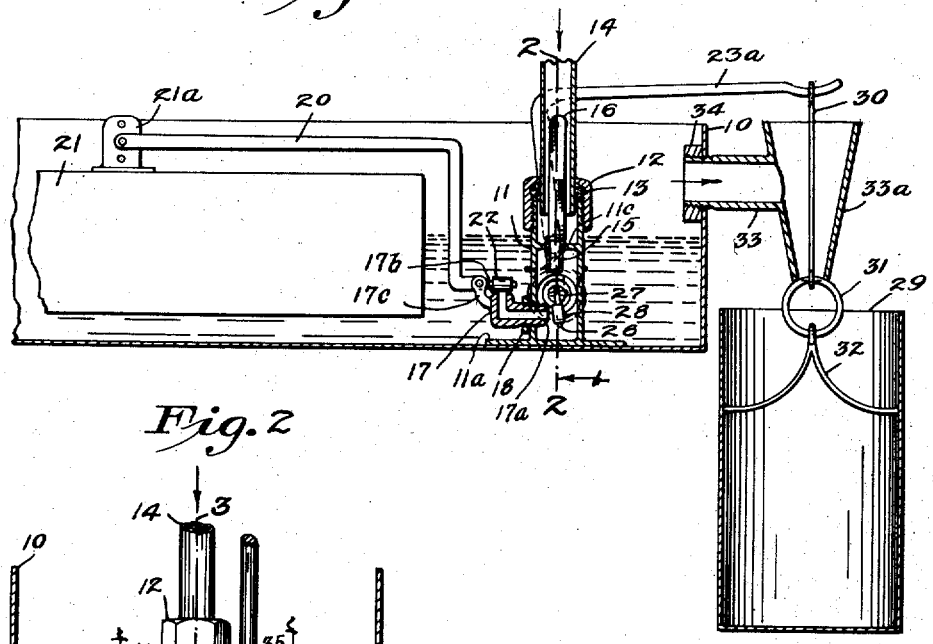
Fig. 2
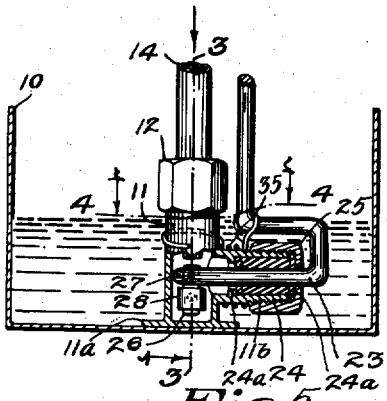
Fig. 4
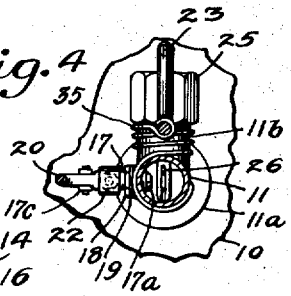
Fig. 5
Fig. 6
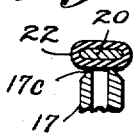
Fig. 3
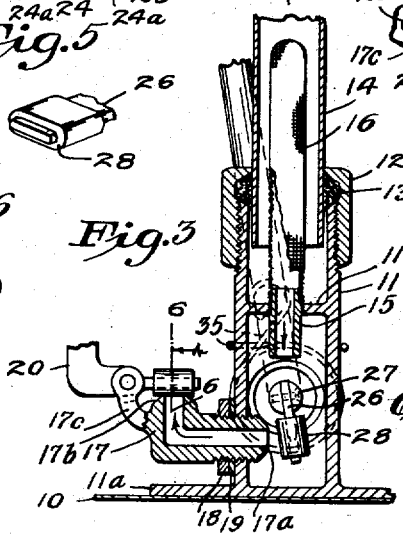
Inventor
Edward C. Rosenow
By his Attorneys
Williamson,
Reif & Williamson Reissued Apr. 4, 1933

Re. 18,788

UNITED STATES PATENT OFFICE

EDWARD C. ROSENOW, OF ROCHESTER, MINNESOTA

FLOAT AND SAFETY VALVE

Original No. 1,788,251, dated January 6, 1931, Serial No. 271,731, filed April 21, 1928. Application for reissue filed September 26, 1932. Serial No. 634,932.

This invention relates to a valve structure or arrangement, and particularly to a valve arrangement adapted to maintain a certain level in a liquid containing receptacle. While the invention is applicable to various tanks in which it is adapted to maintain a level, it particularly is designed for a tank containing water for a humidifying device. In such a device it is desirable and necessary that the valve structure be simple and that it be very positive and accurate in its operation, so that the water supply may be turned on continuously and yet the device will operate with the desired amount of water at all times. It is also desirable to have provision for discontinuing the supply of water if the level should rise beyond a certain point.

It is an object of this invention, therefore, to provide a very simple and efficient valve arrangement for maintaining a certain level of liquid in a receptacle.

It is a further object of the invention to provide a valve structure and arrangement for maintaining a certain level of water in the receptacle with a safety valve of simple form and of very positive operation, for shutting off the supply of water should the level of liquid rise beyond a certain point.

It is a further object of the invention to provide an arrangement of this type in which an improved bearing is provided for the movable member of the valve whereby the desired movement may be effected without any sliding movement of one member on another, serving thus to minimize the danger of sticking of the parts due to deposits of lime or otherwise.

It is still another object of the invention to provide a very simple structure of shut-off valve for a liquid.

It is more specifically an object of the invention to provide a valve structure comprising a liquid supply means for a receptacle, a float operated means for controlling said supply means to maintain a certain level in said receptacle, and a safety valve operated by an overflow receptacle for shutting off said supply means, should said float-operated means fail to operate.

These and other objects and advantages of the invention will be fully set forth in the following description made in connection with the accompanying drawing, in which like reference characters refer to similar parts throughout the several views and in which:—

Fig. 1 is a central vertical section through the receptacle and valve structure, showing the float and float lever in side elevation;

Fig. 2 is a vertical section taken on line 2—2 of Fig. 1;

Fig. 3 is a vertical section taken on line 3—3 of Fig. 2 but shown on an enlarged scale;

Fig. 4 is a horizontal section taken on line 4—4 of Fig. 2;

Fig. 5 is a perspective view of a valve structure used; and

Fig. 6 is a vertical section taken on line 6—6 of Fig. 3, said sections being taken as indicated by the arrows.

Referring to the drawing, a liquid containing tank or receptacle 10 is shown, and while this tank may be of various forms, in the embodiment of the invention illustrated it is shown as being rectangular in cross section. A casing 11 is supported in receptacle 10, said casing being shown as having a bottom flange 11*a* adapted to be secured to the bottom of receptacle 10 in any suitable manner, as by soldering or spot welding. The casing 11 has a vertically extending substantially cylindrical portion having a laterally extending hub or projection 11*b* thereon, as is shown in Figs. 2 and 4. The top of said casing 11 is exteriorly threaded to receive a packing gland 12 between which and the top of said casing a quantity of packing 13 may be placed, adapted to be compressed about the lower end of a liquid supply pipe 14 which will be connected with any convenient water supply such as the water mains of a city. The lower end of pipe 14 terminates some distance above a partition 11*c* extending across member 11, into which is threaded a short section of pipe or nipple 15, the same having secured to its upper portion a cylindrical screen 16 having a closed and rounded upper end. It will be seen that water entering casing 11 through pipe 14 must pass through screen 16 before passing through pipe 15 to the lower portion of casing 11.

Secured in one side of casing 11 and communicating therewith, is a conduit member 17, the same being illustrated as threaded into casing 11 and having a packing nut 18 thereon clamping a gasket member 19 against the side of casing 11. The inner end of member 17 is beveled or tapered to form a comparatively sharp annular edge 17*a*, and the outer end of the member 17, which is directed at right angles to its inner end, is also beveled to form such a sharp annular edge 17*b*. The member 17 carries a projecting lug 17*c* bifurcated at its end to receive a lever 20 which extends upwardly and then horizontally in tank 10 and has pivotally connected to its end a float member 21. Said float member is shown as having a bracket or lug 21*a* secured thereto, provided with several holes, to any one of which lever 20 may be pivoted. The horizontally extending lower end of lever 20 is flattened and has stretched thereabout and embracing the same a resilient member 22 formed of rubber or similar material. The flat surface of member 22 is adapted to be pressed against the edge 17*b* for closing the inner end of the conduit member 17.

A similar valve member is provided for closing the upper end of the conduit member 17, carried by a rod 23 extending centrally through the projection 11*b* of the casing. A packing member 24 preferably of rubber is held in position by a gland 25 threaded on the projection 11*b* such member 24 being fixedly connected with the rod 23 at its inside cylindrical face and fixedly connected with the projection 11*b* at its outside cylindrical face for holding the rod yieldingly in position, the rod being free to rotate in the projection 11*b* to a limited extent by a torsional flexing of the rubber. Metal washers 24*a* are provided at opposite ends of the member 24, such washers and the gland 25 being in slightly spaced relation to the rod 23. The gland is adapted to tighten the member 24 against a shoulder on the inner face of the bore of the projection 11*b*, as shown in Fig. 2. The inner end of rod 23 has secured thereto a downwardly extending arm 26 shown as in the form of a flat bar or plate, the upper end of which is received in a slot formed in rod 23 and pivotally held in place by a screw 27. The lower end of member 26 has a resilient band 28 stretched thereabout and embracing the same, one flat side of which is adapted to be moved against the edge 17*a* for closing the upper end of the conduit member 17.

The rod 23 at the outer side of member 25 is bent upwardly and then horizontally toward casing 11 and is then bent upwardly, said upwardly extending portion having a laterally projecting arm 23*a* at its terminal end extending over the top edge of tank 10 and having a hook formed at its outer end. A receptacle 29 illustrated as of cylindrical shape is suspended from arm 23 by a link 30, the lower end of which is connected to a ring 31 which is in turn connected to a bail 32 having the top portion linked in ring 31 and having outwardly and downwardly curved arms, the ends of which are secured to the inner sides of receptacle 29. The link 30 extends through the vertical arm 33*a* of a T member 33 threaded into one side of tank 10 and provided with a clamping nut 34. A coiled spring 35 extends about the projection 11*b* having one end bent around the vertical portion of casing 11 and its other end bent around the rod 23. This spring 35 normally acts to elevate the arm 23*a* and counterbalance the weight of receptacle 29.

In operation, the lever 20 and float 21 will be set so that the float will be raised to move member 22 against the outer end of member 17 to stop the flow of water when the desired level has been reached in the tank as indicated in Figs. 1 and 2. The water is supplied through the pipe 14 and passes through the screen 16. Any dirt or foreign matter in the water will thus be prevented from passing through the tube 15 to the lower part of casing 11. The valve 22 closes the water passage into the tank through the conduit member 17. When the desired level is obtained in the tank 10, valve 22 closes in a direction opposite to or against the flow of water from member 17. If for any reason valve 22 should fail to function and shut off the flow of water through member 17, water will continue to pass into tank 10 and the level will rise therein so that eventually water will pass through the T 33 as indicated by the arrow in Fig. 1 and will flow through the vertical funnel-shaped arm 33*a* thereof into receptacle 29. The weight of the water accumulating in receptacle 29 will pull down on arm 23*a* of lever or rod 23, causing said rod to rotate about the axis of the portion passing through member 25 and projection 11*b*. This portion swings in clockwise direction as seen in Fig. 3 and valve 28 is moved against the inner end of conduit 17, thus closing this end and preventing any more water from flowing into the tank 10. It will be noted that member 28 moves to its closing position in the same direction as the water flows. This is desirable and assists in insuring that the valve 28, which is the safety valve, will close. On the other hand, the water flowing out of member 17 will tend to keep valve 22 clean and wash away any obstructions. After valve 28 closes, the device will have to receive personal attention and the valve 22 and the float and lever adjusted to work properly. The water in receptacle 29 will be emptied and the parts will again assume their normal position.

From the above description it will be seen that I have provided a very simple regulating and safety valve structure and one that is quite positive in operation. It will be noted that the water level as shown in Fig. 1 is normally kept above the water outlet of member 15, the opening in member 11*b* and the opening in member 17, thus assuring against any trouble from liming of the working parts. It will also be noted that the safety or emergency valve functions without any parts moving through a very tight or highly compressed packing, there being no sliding movement of the surface of the rod 23 on the surface of any other part, such rod having contact with the member 24 only, which member in turn is strongly gripped. This is an advantage, as the parts will be much less liable to stick and a more positive operation is assured. It will also be noted that member 28 closes the inner end of member 17 without any change of volume taking place in the casing 11, member 28 merely changing its position in said casing. Attention is particularly called to the simple structure of closing valves which merely comprise the flat elastic band stretched over the flat supporting member. The device comprises comparatively few parts and is very easily assembled. In assembling, the rod 23, the valve 28 and arm 26 are swung into alignment and then passed into the projection 11*b* through the opening therein and arm 26 permitted to swing downwardly into position. The end of rod 23 extends substantially to the wall of casing 11. The other parts which have been assembled on said rod are then positioned. The device has been amply demonstrated in actual practice and found to be very successful.

It will, of course, be understood that various changes may be made in the form, details, arrangement and proportions of the parts, without departing from the scope of my invention, which. generally stated, consists in a device capable of carrying out the objects above set forth, in the novel parts and combinations of parts disclosed and defined in the appended claims.

What is claimed is:—

1. A valve structure for a water tank having in combination with a supply pipe for said tank, a chamber with which said supply pipe communicates, a discharge conduit leading from said chamber, a valve adapted to engage the end of said conduit to prevent the flow of water therefrom, a float operated lever in said tank for moving said valve, a valve in said chamber adapted to control the flow of liquid through said conduit, said valve being normally open, and an overflow means adapted to move said latter valve to prevent the flow of water through said conduit from said chamber when said first mentioned valve fails to operate.

2. A valve structure for a water tank having in combination with a supply pipe for said tank, a chamber with which said supply pipe communicates, a conduit leading from said chamber, a float operated valve for controlling the flow of water from the outer end of said conduit, constructed and arranged to close in a direction opposite to the flow of water in said conduit, and a valve in said chamber for controlling the flow of water through said conduit when said first mentioned valve fails to function, said latter valve closing in the same direction as the flow of water through said conduit.

3. A valve structure for a water tank having in combination, a chamber through which water passes to said tank, a conduit leading from said chamber, an oscillating float-operated valve cooperating with one end of said conduit to close the same when the water reaches a certain level in said tank, an oscillating valve in said chamber adapted to close another portion of said conduit when said first mentioned valve fails to function, and an overflow means for operating said last mentioned valve.

4. A valve structure for a water tank having in combination, a casing through which water passes to said tank, a conduit leading from said casing, a float operated lever, a valve carried by said lever for closing said conduit when the water reaches a certain level in said tank, a rod extending into the side of said casing and oscillatable therein, a valve carried by said rod normally in open position but adapted to close said conduit upon oscillation of said rod, said rod comprising a lever, and an overflow means adapted to move said lever to oscillate said rod and close said last mentioned valve.

5. A valve structure for maintaining a certain level in a water tank having in combination, a supply pipe for said tank, a casing with which said supply pipe communicates, a conduit leading from said casing having its inner and outer ends formed as valve seats, a float operated valve cooperating with the outer end of said conduit to close the same when the water reaches a certain level in said tank, and a valve in said casing cooperating with the other end of said conduit, a lever for operating said latter valve to close the same when said first mentioned valve fails to operate, and an overflow receptacle connected with said lever for operating the same.

6. A valve structure for maintaining a level of liquid in a tank having in combination, a supply pipe for said liquid, a casing with which said supply pipe communicates for delivery of liquid thereto and having a laterally projecting portion, a conduit communicating with said casing and projecting from the side thereof, a float operated valve cooperating with the outer end of said conduit to close the same when the water reaches a certain level in said tank, a valve cooperating with the inner end of said conduit to close the same when said first mentioned valve fails to function, a rod extending through said laterally projecting portion of said casing and bent to form a lever, an overflow receptacle supported by said lever, and a spring acting on said lever for counterbalancing the weight of said receptacle.

7. A valve structure comprising a conduit, a member movable toward the end of said conduit, said member being in the form of a flattened bar and having a resilient flat band embracing the same, the flat surface of which band is adapted to move against said conduit to close the same.

8. A valve structure comprising a flat bar and a flat resilient band stretched over the same, the flat surface of which is adapted to abut the end of the conduit to close the same.

9. A valve structure for maintaining a level of water in a water tank having in combination, a supply pipe for said water, a casing in said tank with the top of which said pipe communicates, a screen disposed in said casing and pipe through which said water passes, a right-angled conduit secured in said casing having tapered ends forming comparatively sharp annular edges, a float-operated lever, a flat resilient valve carried thereby and adapted to move against the outer end of said conduit to close the same when the water reaches a certain level in said tank, an oscillating member in said casing having a flat resilient surface adapted to move against the inner end of said conduit to close the same when said first mentioned valve fails to function, a rod extending through the side of said casing carrying said oscillating member, said rod being reversely bent and having an arm extending over the edge of said tank, an overflow receptacle suspended on said arm adapted to swing said rod and close said latter valve, and means for holding said valve in open position and counter-balancing the weight of said receptacle.

10. A valve structure for maintaining a certain level in a water tank having in combination, a casing, a supply pipe for said tank communicating with said casing, a member leading from said casing, a valve constructed and arranged to close the outer end of said member when the water reaches a certain level in said tank, and means for closing the inner side of said member when the water reaches a higher level in said tank, said means closing in the same direction as the flow of water through said member.

11. A valve structure for maintaining a level of liquid in a tank having in combination a supply pipe, a casing disposed in said tank with which said supply pipe connects and having a chamber therein, a pipe extending from said chamber, a screen of closed cylindrical shape secured to the end of said pipe and extending into said supply pipe, a conduit extending horizontally from the side of said casing and having a vertically projecting end at the outer side of said casing, the inner end of said conduit being formed as a valve seat, a rod journaled in the side of said casing and having a valve thereon adapted to move against the inner end of said conduit upon oscillation of said rod, said rod having a lever arm, means receiving overflow liquid from said tank for operating said lever arm, a valve for closing the outer end of said conduit, and a float and float lever in said tank for operating said last mentioned valve.

12. In a valve structure for a water tank, the combination of a casing having a passageway therethrough, a valve member for closing said passageway, means controlled by the supply of liquid in said tank for moving said valve member into and out of operative closure position, a second valve member in said casing also adapted to close said passageway and standing normally in open position, and overflow means actuated by excess liquid from said casing for moving said second valve member into closure position when said first named valve member fails to operate.

13. In a valve structure for a water tank, the combination of a casing having a passageway therethrough, a valve member movable against the stream of liquid through said passageway for closing the passageway, means controlled by the supply of liquid in said tank for moving said valve member into and out of operative closure position, and a second valve member in said casing movable with the stream of liquid through said passageway for closing the passageway when said first named valve member fails to function.

14. In a valve structure for a water tank, the combination of a casing having a discharge opening through a portion of its wall, valve seats at opposite faces of said wall portion about said discharge opening, valve members adapted to close against said seats respectively for effectively closing said discharge opening, means for delivering liquid under pressure to said casing, means controlled by the supply of liquid in said tank for moving one of said valve members to its effective closure position, and overflow means actuated by excess liquid from said casing for moving the other of said valve means into effective closure position when said first named valve member fails to operate.

15. In a valve structure for a water tank, the combination of a casing having a discharge opening through a portion of its wall, valve seats at opposite faces of said wall portion about said discharge opening, two valve members one located outside of said casing and the other located inside of the casing adapted to close against said seats respectively for effectively closing said discharge opening, means for delivering liquid under pressure to said casing, means controlled by the supply of liquid in said tank for moving one of said valve members to its effective closure position, and overflow means actuated by excess liquid from said casing for moving the other of said valve members into effective closure position when said one valve member fails to operate, the means for operating the valve member located inside of the casing comprising a rod extending into said casing through an opening through the wall in spaced relation to the wall about the rod, and resilient block means non-rotatably connected with said rod at the point of bearing on the rod and non-rotatably connected with said casing at the point of bearing on the casing and serving to close said opening about the rod and to support the rod rotatably in position with respect to the casing.

16. A valve structure comprising in combination a casing having a passageway therethrough and having an opening in the wall, a rod extending into said casing through said opening in spaced relation to the wall about the rod, a valve member actuated by a movement of said rod with respect to the casing for at least partially closing said passageway, and resilient block means effectively connected throughout its length in non-slipping engagement with both the casing and the rod and serving to close said opening about the rod and to support the rod movably with respect to the casing.

17. A valve structure comprising in combination a casing having a passageway therethrough and having an opening in the wall, a rod extending into said casing through said opening in spaced relation to the wall about the rod, a valve member actuated by a movement of said rod with respect to the casing for at least partially closing said passageway, a resilient block closing said opening about said rod and effectively connected throughout its length with both the casing and the rod for preventing surface slipping of the block with respect to said parts and for supporting the rod movably with respect to the casing, and means for gripping the block tightly for giving it a stuffing box effect in said opening.

18. A valve structure comprising in combination a casing having a passageway therethrough and having an opening in the wall, a rod extending into said casing through said opening in spaced relation to the wall about the rod, a valve member actuated by a rotary movement of said rod with respect to the casing for at least partially closing said passageway, a resilient block closing said opening about said rod and effectively connected with both the casing and the rod for preventing surface slipping of the block with respect to said parts and for supporting the rod rotatably with respect to the casing, and means for applying pressure longitudinally of the block at both ends of the block for compressing it into stuffing box relationship in said opening.

19. A valve structure comprising in combination a casing having a passageway therethrough and having an opening in the wall, a rod extending into said casing through said opening in spaced relation to the wall about the rod, a valve member actuated by a rotary movement of said rod with respect to the casing for at least partially closing said passageway, and resilient block means of substantially uniform diameter throughout its length non-rotatably connected with said rod at its inner bearing surface and non-rotatably connected with said casing at its outer bearing surface and serving to close said opening about the rod and to support the rod rotatably in position with respect to the casing.

20. A valve structure comprising in combination a casing having a passageway therethrough and having an opening in the wall, a rod extending into said casing through said opening in spaced relation to the wall about the rod, a valve member connected with said rod within said casing actuated by a rotary movement of said rod for closing said passageway, resilient block means closing said opening about said rod and non-rotatably connected with said rod at its inner bearing surface and non-rotatably connected with said casing at its outer bearing surface for supporting the rod rotatably in position with respect to the casing, means for applying pressure longitudinally of said block means at both ends thereof for compressing the same, a lever arm connected with said rod outside of said casing, an overflow receptacle connected with said arm for support thereby, a tank, and means adapted when the water rises to a certain predetermined level in said tank to deliver water from said tank to said overflow receptacle for effecting a closing movement of said valve member.

EDWARD C. ROSENOW.